United States Patent [19]

Szukay et al.

[11] Patent Number: 4,818,166
[45] Date of Patent: Apr. 4, 1989

[54] FASTENING A COMPONENT ON A SHAFT OR IN A BORE AGAINST AXIAL DISPLACEMENT

[75] Inventors: Hans-Joachim Szukay, Bergisch-Gladbach; Wilhelm Maul, Cologne, both of Fed. Rep. of Germany

[73] Assignee: Ford Motor Company, Dearborn, Mich.

[21] Appl. No.: 34,361

[22] Filed: Apr. 6, 1987

[30] Foreign Application Priority Data

Jul. 25, 1986 [DE] Fed. Rep. of Germany ....... 3625148

[51] Int. Cl.[4] .................... F16B 19/00; B23P 19/00
[52] U.S. Cl. .................... 411/361; 411/353; 411/519; 29/520; 29/525.1; 403/261
[58] Field of Search ............... 411/103, 107, 109, 353, 411/361, 360, 517, 519, 521, 969, 999; 29/517, 520, 526 R; 403/278, 281, 282, 261, 259, 360

[56] References Cited

U.S. PATENT DOCUMENTS 3,923,408 12/1975 Belsdorf .................. 411/517
4,006,659 2/1977 Wurzel et al. .............. 411/518

FOREIGN PATENT DOCUMENTS 2204831 3/1975 Fed. Rep. of Germany .
603821 12/1924 France ................... 29/517
1324595 3/1963 France ................... 411/517
103249 12/1941 Sweden .................. 411/518
339455 12/1930 United Kingdom ........... 411/519

Primary Examiner—Neill R. Wilson
Attorney, Agent, or Firm—Frank G. McKenzie; Donald J. Harrington

[57] ABSTRACT

An attachment and method for axially securing a component on the surface of a shaft or bore by forming an annular groove adjacent the component and inserting a closed retaining ring within the annular groove. The retaining ring has a larger internal diameter than the diameter of the shaft or a smaller external diameter than the diameter of the bore. The retaining ring is pressed into the annular groove and plastically deformed by a tool that contacts the ring at angularly spaced portions of the retaining ring surface until the ring fills the groove without axial clearance or play. The annular groove formed on the shaft or bore has a cross section for receiving a standard commercial retaining ring or circlip. The portions of the retaining ring located between the portions that are deformed by the tool form convex portions that extend radially away from the annular groove and define a space for the insertion of a prying tool.

4 Claims, 2 Drawing Sheets

FASTENING A COMPONENT ON A SHAFT OR IN A BORE AGAINST AXIAL DISPLACEMENT

BACKGROUND OF THE INVENTION

1. Field of the Invention

This invention relates to the field of mechanical fasteners and, more particularly, to fasteners that secure a component on the surface of a shaft or a bore so that the component is prevented from moving axially relative to the member to which it is secured.

2. Description of the Prior Art

German Patent No. 22 04 831 describes a method for securing a component on the outer surface of a shaft by forming an annular groove in the shaft adjacent the component and by plastically, conically deforming a closed retaining ring against a surface of the component being secured to the shaft. The retaining ring has one of its end faces bearing against the groove of the shaft and its opposite end face bearing against the component. A tool forces the retaining ring further within the groove and forces the ring against the component by compressing the retaining ring between the component and the end face of the annular groove. Before deformation, the internal diameter of the retaining ring is slightly greater than the diameter of the shaft.

This method requires that specially formed annular grooves located adjacent the component be used and that the closed retaining ring be longer axially than its radial thickness. This technique has the disadvantage that it cannot be applied in a space that is restricted structurally and the retaining ring cannot be released from the groove with simple tools because its conical deformation prevents access to a surface for removal by prying.

SUMMARY OF THE INVENTION

An objective of this invention is to provide an improved fastener and fastening method for use in securing a component on the surface of the shaft or a bore so that only one annular groove of the type used for a standard retaining ring or circlip is required. It is another object of this invention that the size of the retaining ring and the space required to install, deform and remove it be as small as possible. It is another object of this invention that the retaining ring used in accordance with this invention can be removed from the shaft or bore with simple tools during repairs in a workshop other than the manufacturing plant and can be replaced there by a standard retaining ring or circlip.

The annular groove formed in the shaft or bore according to this invention has a cross section for receiving a standard retaining ring or circlip. A closed retaining ring to be fitted within the groove preferably has a larger radial thickness than the depth of the annular groove and a smaller axial width than the width of the annular groove before it is deformed. The retaining ring is deformed radially inward after it is fitted on a shaft, or radially outward after it is fitted within a bore, through the operation of a tool that contacts angularly spaced portions of the surface of the retaining ring and displaces those portions radially so that they fully fill the annular groove and prevent displacement of the component relative to the groove. The other portions of the retaining ring not contacted by the tool are deformed by the action of the tool into convex portions that extend away from the annular groove and define a space between the groove and the deformed portions. The retaining ring is produced with little material and labor by pressing it from suitable sheet metal material or, in the case of higher loads, from a seamless tube. The retaining ring forms a reliable fastener that resists axial displacement of the component relative to the shaft or bore because of the tight fit of the deformed ring in the annular groove without clearance or play. Because of the presence of the raised convex portions of the retaining ring between the plastically deformed portions contacted by the tool, it is possible to disassemble the retaining ring according to this invention by inserting a chisel or other prying device in the space between the convex portions of the retaining ring and the annular groove. When this is done and the prying tool is forced axially into the space, the retaining ring readily fractures through its radial thickness and along its length, thereby destroying its circumferential structural continuity so that the ring can be removed from the groove.

Because the annular groove formed on the surface of the shaft or bore adjacent the component to be secured is a standard annular groove suitable for use to retain a standard retaining ring or circlip, and the plastically deformed retaining ring can be removed from the groove simply, the method according to this invention can be used at the manufacturing plant, for example, to secure components inside the gearbox of a motor vehicle. When a repair is required at a workshop, the retaining ring of this invention can be replaced following the repair with a standard retaining ring or circlip.

BRIEF DESCRIPTION OF THE DRAWINGS

The method and structure according to this invention is explained in greater detail with reference to the embodiments illustrated in the drawings.

DESCRIPTION OF THE PREFERRED EMBODIMENTS

Figure 1:
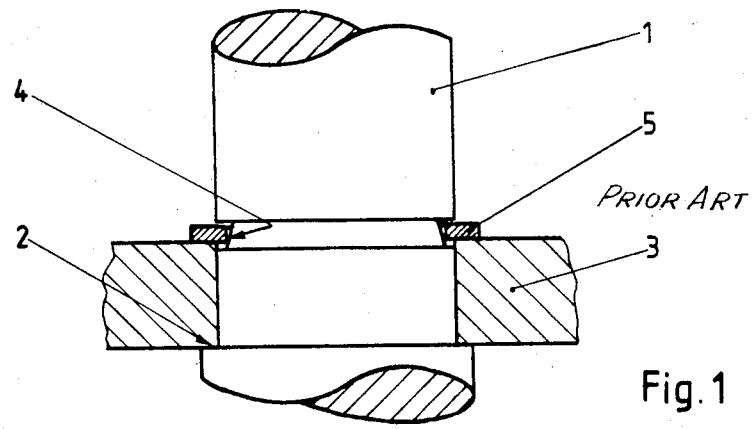
FIG. 1 is a cross section through a standard retaining ring or circlip used to fasten a component on the outer surface of a shaft.

Referring first to FIG. 1, a shaft 1 is formed with a shoulder 2 against which a component 3, such as a gear wheel, is brought into contact. Adjacent the component on the outer surface of the shaft, an annular groove 4 is formed, which has a cross section as required to receive within the groove a standard retaining ring or circlip 5. In conventional attachments of this sort, if it is desired to make a fastening arrangement without axial clearance between the components and the shoulder, either retaining rings or circlips sized to fit with little or no clearance between the component and the face of the groove are used, or the retaining ring or circlip has a wedge-shaped cross section that produces the same effect. In either case, the amount of time and complexity required to fit the retaining rings without clearance or to form wedge-shaped circlips is substantial.

Figure 2:
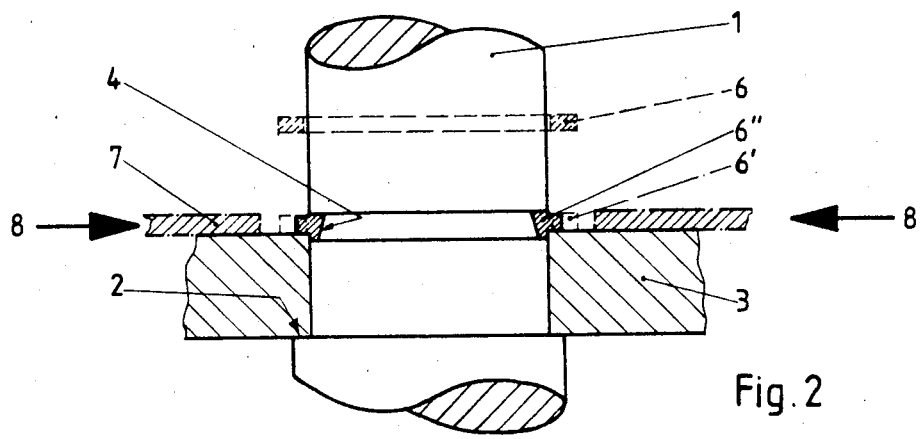
FIG. 2 is a cross section through a fastening arrangement according to this invention that shows the retaining ring in various stages of assembly during the fastening process.
Figure 3:
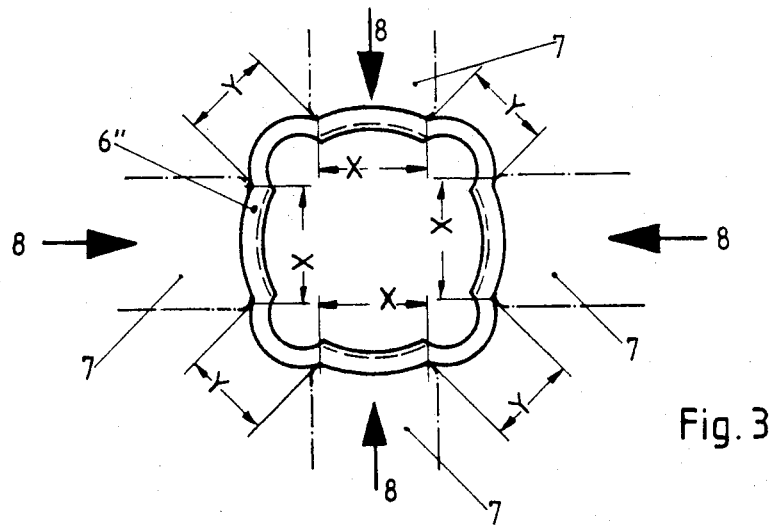
FIG. 3 is a top view of the retaining ring of FIG. 2 after deformation by the assembly tool.

With respect to the fastening arrangement according to this invention illustrated in FIG. 2, the shaft 1 is formed with the shoulder 2 against which the component 3 to be secured to the shaft is brought into contact. The annular groove 4, formed adjacent the component 3, is substantially the same as the annular groove used to receiver a standard retaining ring or circlip.

A closed retaining ring 6, shown in FIG. 2 in broken lines in its undeformed state, easily moves axially along the shaft because it has an internal diameter somewhat larger than the diameter of the shaft. The axial width of the retaining ring is somewhat less than the axial width of the annular groove. When the retaining ring bears against the component 3, it is located at the position 6'. Thereafter, the retaining ring is plastically deformed radially inward by having developed on its outer surface an inwardly direct bearing pressure represented by arrows 8 developed by contact between an attaching tool 7 and the portion of the retaining ring adjacent the surface of the tool. The deformation continues until the partial areas X of the retaining ring 6" are plastically deformed so that they fill the entire cross section of the annular groove without clearance or play between the component and the shaft. Because of the radial displacement of the partial areas X of the retaining ring 6", convex portions Y of the retaining ring located between the partial areas X are formed and extend radially outward from the axis of the shaft into the annular groove.

Figure 4:
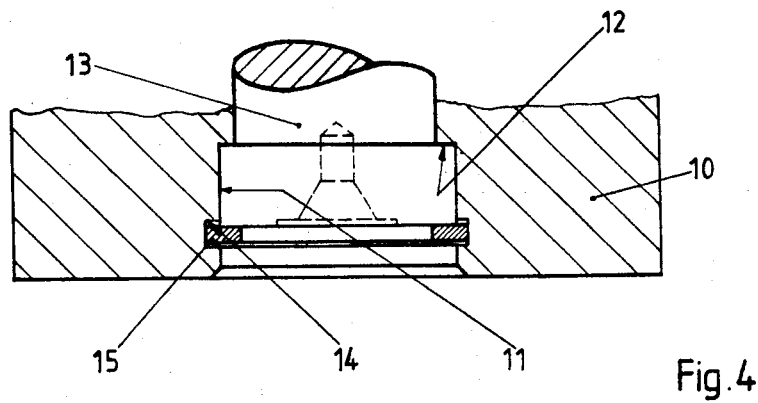
FIG. 4 is a cross section through a standard retaining ring or circlip used to secure a component to the surface of a bore.

In the conventional fastening arrangement illustrated in FIG. 4, a bore 11 defines a shoulder 12 in a component 10. A shaft 13 inserted into the bore is secured to the component by locating a standard retaining ring or circlip 15 within an annular groove 14. If it is necessary to fasten the component to the shaft without axial clearance or play between the component and the shaft, a retaining ring is fitted into the groove such that an axial face of the ring bears on the shoulder and on a side wall of the groove without axial clearance. Alternatively, a circlip or retaining ring having a wedge shape can be fitted into the groove to take up axial clearance.

Figure 5:
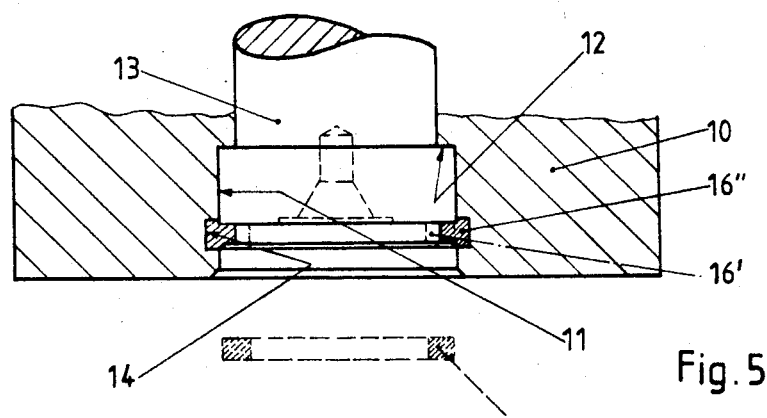
FIG. 5 is a cross section through a fastener according to this invention used to secure a component to the surface of a bore and shows the retaining ring before and after insertion into the bore.
Figure 6:
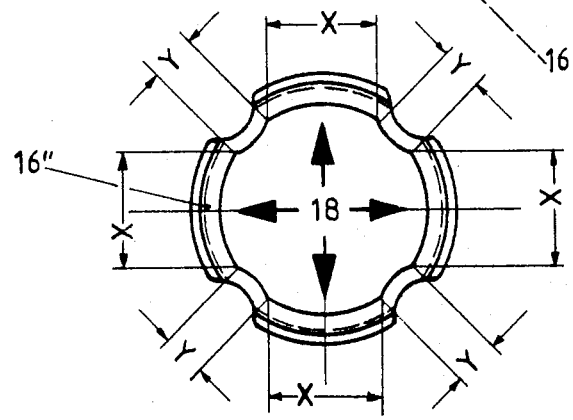
FIG. 6 is an end view of the retaining ring of FIG. 5 after deformation by the assembly tool.

The fastening arrangement according to this invention illustrated in FIG. 5 includes a bore 11 having a shoulder 12 formed in a component 10 to be secured to the shaft 13, the component having a standard annular groove 14 formed on the surface of the bore. A closed retaining ring 16, shown in its undeformed state below the bore, has an external diameter somewhat less than the diameter of the bore 11 and an axial width somewhat less than the width of the annular groove 14. When the retaining ring is in the position 16', outwardly directed forces acting upon partial areas X of the ring in the direction of the arrows 18 of FIG. 6 developed by bearing contact between an assembly tool and the inner surface of the ring cause the partial areas X to deform plastic radially outward until they fill the annular groove fully without axial clearance between the component 10 and the shaft 13. As the retaining ring expands radially outward, convex portions Y rise from the annular groove and extend radially inward. A chisel, screwdriver or other prying tool can be inserted into the space between the convex portions of the retaining ring and the bore so that by prying the ring can be split and removed from the annular groove.

In the embodiments illustrated in the drawings, the retaining rings 6 and 16 are radially deformed plastically at four partial areas of the retaining ring. The number of partial areas that can be established for a particular radial deformation is a function of the diameter of the retaining ring and is in accordance with the desired securing forces. The number of partial areas may be even or odd. When selecting the number of partial areas, the convex raised portions produced by the displacement of the material should be sufficiently large for appropriate simple tools to be inserted and to separate the retaining ring.

Having described the preferred embodiments of our invention, what we claim and desire to secure by U.S. Letters Patent is:

1. An attachment for fastening a component to a surface comprising:
    an annular groove formed on the surface adapted to receive therein a retaining ring;
    a retaining ring having angularly spaced first portions deformed into the groove so that the retaining ring fits within the groove without axial clearance, and second portions located adjacent the first portions deformed radially away from the annular groove by deformation of the first portions; and
    a shoulder formed on the surface for contact with the component to prevent displacement of the component in one axial direction, the retaining ring forcing the component into contact with the shoulder after deforming the first portions into the groove.

2. The attachment of claim 1 wherein the component is fastened to the surface of a bore, the annular groove is formed on the surface of the bore adjacent the component, the first portions of the retaining ring are pressed radially outward into the groove so that the retaining ring fits within the groove without axial clearance and the second portions of the retaining ring are deformed radially inward.

3. An attachment for fastening a component to a surface comprising:
    an annular groove formed on the surface having a width and depth adapted to receive a retaining ring therein;
    a retaining ring having initially a clearance with respect to the surface that permits alignment of the retaining ring with the groove, angularly spaced first portions deformed plastically into the groove, filling the groove without clearance between the component and surface, and second portions located adjacent the first portions deformed away from the groove by deformation of the first portions; and
    a shoulder formed on the surface, the retaining ring forcing the component into contact with the shoulder after deforming the first portions into the groove.

4. The attachment of claim 3 wherein the retaining ring initially has a width less than the width of the groove and after deforming the first portions, the retaining ring expands across the width of the groove at least along a portion of the periphery of the retaining ring.

* * * * *